United States Patent
Shishido

(10) Patent No.: US 11,873,189 B2
(45) Date of Patent: Jan. 16, 2024

(54) WINDING DEVICE AND MANUFACTURING METHOD OF WOUND BODY

(71) Applicant: KABUSHIKI KAISHA TOSHIBA, Tokyo (JP)

(72) Inventor: Ryunosuke Shishido, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 116 days.

(21) Appl. No.: 17/457,536

(22) Filed: Dec. 3, 2021

(65) Prior Publication Data
US 2022/0259007 A1     Aug. 18, 2022

(30) Foreign Application Priority Data

Feb. 16, 2021    (JP) ................... 2021-022672

(51) Int. Cl.
    *B65H 81/06*         (2006.01)
    *H01M 10/04*       (2006.01)
    *B65H 20/02*         (2006.01)

(52) U.S. Cl.
CPC ............. *B65H 81/06* (2013.01); *B65H 20/02* (2013.01); *H01M 10/0431* (2013.01); *B65H 2404/152* (2013.01)

(58) Field of Classification Search
CPC .. B65H 20/02; B65H 81/06; B65H 2404/152; H01M 10/0431
See application file for complete search history.

(56) References Cited

U.S. PATENT DOCUMENTS

2010/0081042 A1    4/2010   Morishima et al.

FOREIGN PATENT DOCUMENTS

| CN | 103311577 A | * | 9/2013 | |
|---|---|---|---|---|
| JP | 11-40144 A | | 2/1999 | |
| JP | 2005-79079 A | | 3/2005 | |
| JP | 2009-280355 A | | 12/2009 | |
| JP | 2010-86812 A | | 4/2010 | |
| JP | 2013-98026 A | | 5/2013 | |
| JP | 2014-110202 A | | 6/2014 | |
| JP | 2014-123491 A | | 7/2014 | |
| JP | 2014-135260 A | | 7/2014 | |
| WO | WO-2012023422 A1 | * | 2/2012 | ............. H01G 13/02 |

OTHER PUBLICATIONS

Machine translation of CN 103311577-A; Publication Sep. 2013.*
Machine translation of WO 2012023422: Publication Feb. 2012.*

* cited by examiner

*Primary Examiner* — Vishal I Patel
(74) *Attorney, Agent, or Firm* — Oblon, McClelland, Maier & Neustadt, L.L.P.

(57) ABSTRACT

According to an embodiment, a winding device includes a core, a transfer path, a pinch roller, a detection unit, a driving unit, and a control unit. A band body is wound around the core. The transfer path transfers the band body to the core. The pinch roller presses the band body being transferred in the transfer path from one side of a first direction intersecting a transfer direction, and presses a partial range of the band body in a second direction intersecting both the transfer direction and the first direction. The detection unit detects an abnormally shaped portion formed in the band body in the transfer path. The control unit controls the driving unit based on a result of detection by the detection unit.

5 Claims, 4 Drawing Sheets

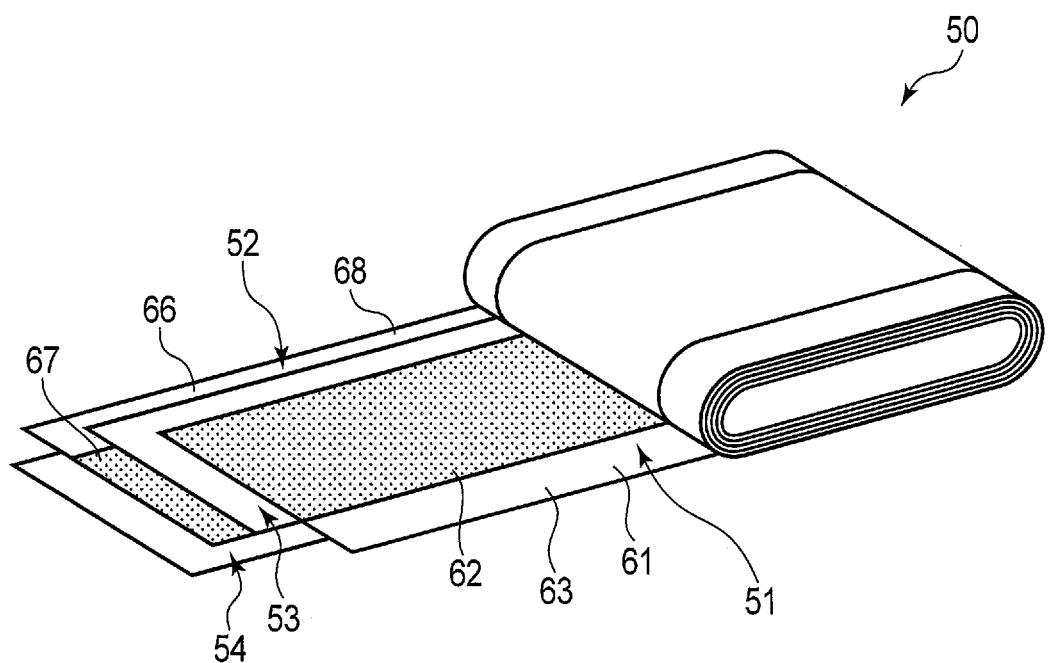
F I G. 2

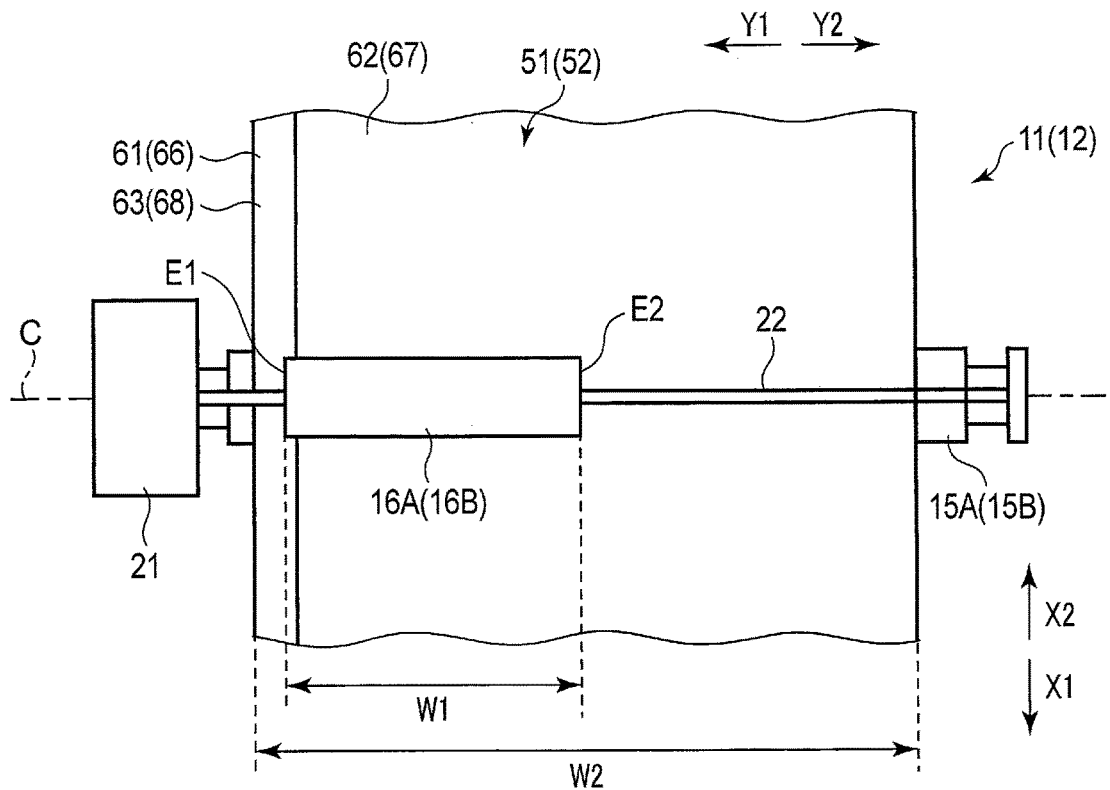
F I G. 3
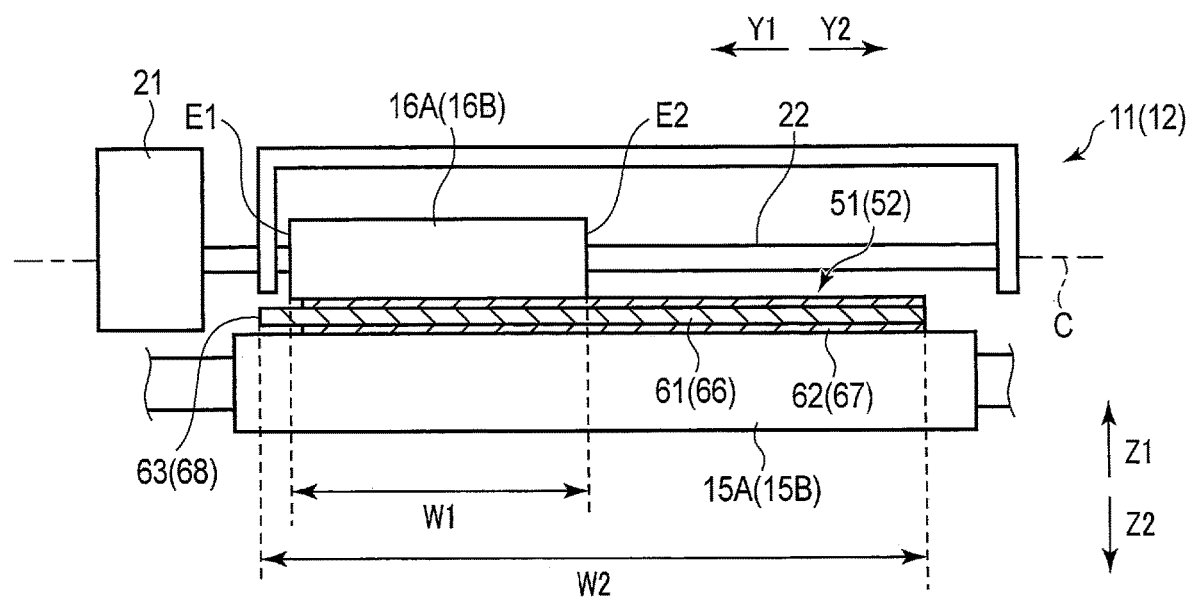
F I G. 4

WINDING DEVICE AND MANUFACTURING METHOD OF WOUND BODY

CROSS-REFERENCE TO RELATED APPLICATIONS

This application is based upon and claims the benefit of priority from Japanese Patent Application No. 2021-022672, filed Feb. 16, 2021; the entire contents of which are incorporated herein by reference.

FIELD

Embodiments described herein relate generally to a winding device and a method of manufacturing a wound body.

BACKGROUND

For manufacturing of a wound body such as an electrode group of a battery, a winding device is used. Such a winding device includes a core, and is configured in such a manner that one or more band bodies are wound around the core through rotation of the core. For example, an electrode group of a battery includes a plurality of band bodies such as a negative electrode sheet and a positive electrode sheet, and is formed by winding, around the core, a plurality of band bodies that are overlapped on one another. In some winding devices, a pinch roller is arranged in a transfer path along which a band body is transferred to a core. In the transfer path of such a winding device, the pinch roller presses the band body being transferred from a direction that intersects a transfer direction, and the band body is pressed by the pinch roller from one side of a thickness direction. The pinch roller allows the band body to be transferred to the core at a stable transfer speed.

For manufacturing of a wound body that uses a winding device as described above, there is a case where a band body in which abnormally shaped portions such as convex and concave portions, kinks, and wrinkles are formed is used. In such a case, it is requested that the band body be transferred to the core with the shape abnormality of the abnormally shaped portions reduced to a small level, and that the band body be wound around the core with the shape abnormality reduced to a small level. Through the winding of the band bodies around the core with the shape abnormality reduced to a small level, occurrence of failures in the wound body such as the electrode group can be efficiently prevented.

BRIEF DESCRIPTION OF THE DRAWINGS

FIG. 2 is a schematic diagram showing an example of an electrode group formed by the winding device according to the embodiment of FIG. 1.

FIG. 3 is a schematic diagram showing a configuration of a pinch roller in a single transfer unit of the winding device according to the embodiment and a neighborhood thereof, as viewed from a side on which the pinch roller is positioned in a first direction of the transfer unit.

FIG. 4 is a schematic diagram showing a configuration of a pinch roller in a single transfer unit of the winding device according to the embodiment and a neighborhood thereof, as viewed from a transfer direction.

DETAILED DESCRIPTION

According to an embodiment, a winding device includes a core, a transfer path, a pinch roller, a detection unit, a driving unit, and a control unit. A band body is wound around the core. The transfer path transfers the band body to the core. The pinch roller presses the band body being transferred in the transfer path from one side of a first direction that intersects a transfer direction, and presses a partial range of the band body in a second direction that intersects both the transfer direction and the first direction. The detection unit detects an abnormally shaped portion formed in the band body in the transfer path. The driving unit moves the pinch roller along the second direction. The control unit controls the driving unit based on a result of detection by the detection unit.

Hereinafter, embodiments will be described with reference to the drawings.

Figure 1:
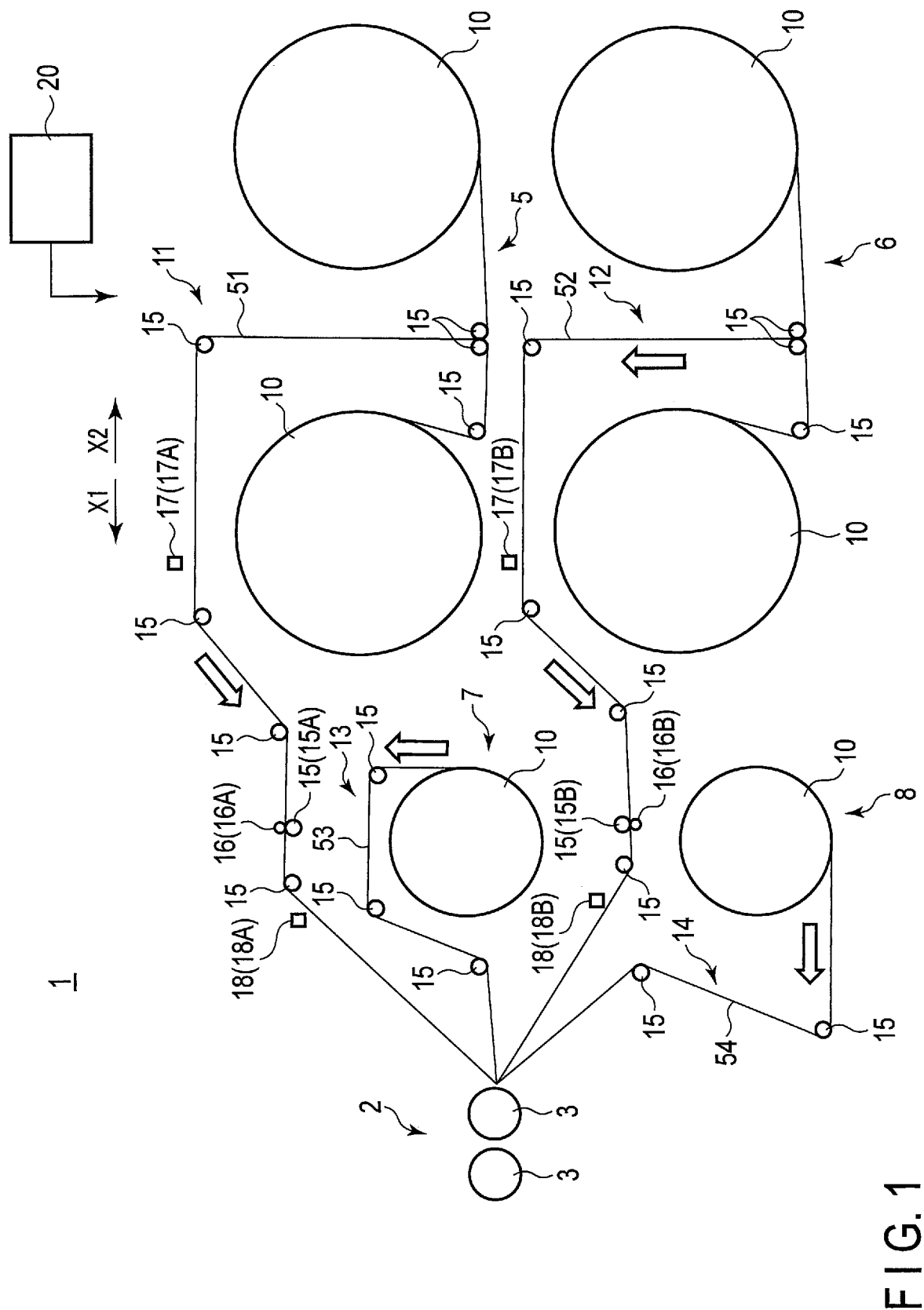
FIG. 1 is a schematic diagram showing a winding device according to an embodiment.

In the embodiments, a winding device is provided. The winding device forms a wound body around which a band body is wound. Examples of the wound body formed by the winding device include an electrode group of a battery, a capacitor, and the like. FIG. 1 shows a winding device 1 according to an embodiment. In the embodiment of FIG. 1, an electrode group of a battery is formed as a wound body. The electrode group is formed of four band bodies, namely, a negative electrode sheet 51, a positive electrode sheet 52, and separator sheets 53 and 54.

FIG. 2 shows an example of an electrode group 50 formed by the winding device 1 according to the embodiment of FIG. 1. As shown in FIG. 2, the electrode group 50 is formed in the winding device 1 by winding four band bodies (51-54) that are overlapped on one another. In the winding device 1, the four band bodies (51-54) are wound while being overlapped on one another in the order of the negative electrode sheet 51, the separator sheet 53, the positive electrode sheet 52, and the separator sheet 54. In the electrode group 50, a negative electrode is formed by the negative electrode sheet 51, and a positive electrode is formed by the positive electrode sheet 52. In the electrode group 50, a separator that electrically insulates the positive electrode and the negative electrode is formed by the separator sheets 53 and 54.

The electrode group 50 illustrated in FIG. 2 is configured in such a manner that the negative electrode sheet 51 is on the upper side (inner peripheral side when wound) and the positive electrode sheet 52 is on the lower side (outer peripheral side when wound); however, such a configuration is merely an example, and the present embodiment can be implemented even when the electrode group 50 is configured in such a manner that the positive electrode sheet 52 is on the upper side (inner peripheral side when wound) and the negative electrode sheet 51 is on the lower side (outer peripheral side when wound).

In the example of FIG. 2, the negative electrode sheet 51 includes a current collector (negative-electrode current collector) 61 and an active-material containing layer (negative-electrode active-material containing layer) 62 supported on a surface of the current collector 61. In the negative electrode sheet 51, a non-support portion 63 in which the current collector 61 does not support the active-material containing layer 62 is formed on one of a pair of longer-side edges and its neighborhood portion. In the negative electrode sheet 51, the non-support portion 63 is formed over the entire length or substantially the entire length according to the longitudinal direction along the longer-side edge. Similarly, the positive electrode sheet 52 includes a current collector (positive-electrode current collector) 66 and an active-material containing layer (positive-electrode active-material containing layer) 67 supported on a surface of the current collector 66. In the positive electrode sheet 52, a non-support portion 68 in which the current collector 66 does not support the active-material containing layer 67 is formed on one of a pair of longer-side edges and its neighborhood portion. In the positive electrode sheet 52, the non-support portion 68 is formed over the entire length or substantially the entire length according to the longitudinal direction along the longer-side edge. In FIG. 2, the active-material containing layers 62 and 67 are shown by dotted hatching.

In each of the band bodies (51-54), a longitudinal direction that is along a pair of longer-side edges is defined, and a width direction that intersects (is orthogonal or substantially orthogonal to) the longitudinal direction, and a thickness direction that intersects (is orthogonal or substantially orthogonal to) both the longitudinal and width directions is defined. In each of the band bodies (51-54), a pair of shorter-side edges is along the width direction. In each of the band bodies (51-54), a dimension (width) along the width direction is smaller than a dimension along the longitudinal direction, and a dimension along the thickness direction is smaller than the dimension along the width direction.

As shown in FIG. 1, the winding device 1 includes a spooling unit (spooler) 2. In the spooling unit 2, one or more cores 3 are arranged, and two cores 3 are arranged in the example of FIG. 1. Each of the cores 3 is rotatable around a rotation axis, and the rotation axis of each core 3 is orthogonal or substantially orthogonal to the plane of FIG. 1. When the electrode group 50 is formed, one of the cores 3 is rotated around its rotation axis. By winding the four band bodies (51-54) that are overlapped on one another around the core 3, the electrode group 50, which is a wound body, is formed.

The winding device 1 includes four supply units (suppliers) 5-8 and four transfer units (conveyers) 11-14. Two reels 10 are arranged in each of the supply units 5 and 6, and a single reel 10 is arranged in each of the supply units 7 and 8. In each reel 10, a corresponding one of the band bodies (51-54) is wrapped in a roll. In the supply unit 5, the negative electrode sheet 51 is fed from one of the two reels 10 to the transfer unit 11, and in the supply unit 6, the positive electrode sheet 52 is fed from one of the two reels 10 to the transfer unit 12. In the supply unit 7, the separator sheet 53 is fed from the reel 10 to the transfer unit 13, and in the supply unit 8, the separator sheet 54 is fed from the reel 10 to the transfer unit 14. Each of the supply units 5-8 intermittently feeds a corresponding one of the band bodies (51-54) to a corresponding one of the transfer units 11-14. In a single feeding, each of the band bodies (51-54) is fed by a predetermined length in the longitudinal direction along the pair of longer-side edges.

A transfer path is formed by each of the transfer units 11-14. The transfer unit 11 transfers the negative electrode sheet 51 fed from the supply unit 5 to the core 3 via the transfer path, and the transfer unit 12 transfers the positive electrode sheet 52 fed from the supply unit 6 to the core 3 via the transfer path. The transfer unit 13 transfers the separator sheet 53 fed from the supply unit 7 to the core 3 via the transfer path, and the transfer unit 14 conveys the separator sheet 54 fed from the supply unit 8 to the core 3 via the transfer path. In each of the transfer units (transfer paths) 11-14, the transfer direction in which the band bodies (51-54) are transferred, namely, the direction going toward the core 3, is the downstream side. In each of the transfer units 11-14, a direction opposite to the transfer direction, namely, a direction going toward a corresponding one of the supply units 5-8, is the upstream side. In the example of FIG. 1, the side of an arrow X1 is a downstream side of the transfer unit 11, and the side of the arrow X2 is an upstream side of the transfer unit 11.

In each of the transfer units (transfer paths) 11-14, a first direction that intersects (is orthogonal or substantially orthogonal to) the transfer direction and a second direction as a width direction that intersects (is orthogonal or substantially orthogonal to) both the transfer direction and the first direction is defined. In the example of FIG. 1, a direction that is orthogonal or substantially orthogonal to the plane of FIG. 1 matches or substantially matches the second direction (width direction) of each of the transfer units 11-14. Each of the transfer units 11-14 transfers a corresponding one of the band bodies (51-54) in a state in which a thickness direction of a corresponding one of the band bodies (51-54) matches or substantially matches the first direction, and a width direction of a corresponding one of the band bodies (51-54) matches or substantially matches the second direction.

In each of the transfer units (transfer paths) 11-14, one or more guide rollers 15 are arranged; in the example of FIG. 1, a plurality of guide rollers 15 are arranged in each of the transfer units 11-14. In each of the transfer units 11-14, namely, in each of the four transfer paths, the guide rollers 15 guide a corresponding one of the band bodies (51-54) to the core 3. The number, arrangement, etc. of the guide roller 15 in each of the transfer units 11-14 is not limited to the example of FIG. 1, and may be suitably changed in accordance with the arrangement of the supply units 5-8, the arrangement of the core 3, and the like.

In each of the transfer units 11 and 12, the pinch roller 16 and the detection units (detectors) 17 and 18 are arranged. The pinch roller 16 is formed of, for example, rubber. In each of the transfer units (transfer paths) 11 and 12, the pinch roller 16 abuts a band body being transferred (a corresponding one of 51 and 52) from one side of the first direction, and presses the band body (a corresponding one of 51 and 52) from the one side of the first direction. In the transfer unit 11, the pinch roller 16 and a guide roller 15A, which is one of the guide rollers 15, interpose a negative electrode sheet 51 being transferred, and the pinch roller 16 abuts the negative electrode sheet 51 from a side opposite to the guide roller 15A in a first direction (thickness direction of the negative electrode sheet 51). In the transfer unit 12, the pinch roller 16 and a guide roller 15B, which is one of the guide rollers 15, interpose a positive electrode sheet 52 being transferred, and the pinch roller 16 abuts the positive electrode sheet 52 from a side opposite to the guide roller 15B in a first direction (thickness direction of the positive electrode sheet 52). In each of the transfer units (transfer paths) 11 and 12, a band body (a corresponding one of 51 and 52) is transferred to the core 3 at a stable transfer speed by the pinch roller 16. A pinch roller 16 that is arranged in the transfer unit 11 is referred to as a pinch roller 16A, and a pinch roller 16 that is arranged in the transfer unit 12 is referred to as a pinch roller 16B.

In each of the transfer units 11 and 12, the detection unit (first detection unit) 17 is arranged on an upstream side relative to the pinch roller 16, and is arranged between the pinch roller 16 and the supply unit (a corresponding one of 5 and 6). In each of the transfer units 11 and 12, the detection unit (second detection unit) 18 is arranged on a downstream side relative to the pinch roller 16, and is arranged between the pinch roller 16 and the core 3. In each of the transfer units (transfer paths) 11 and 12, the detection unit 17 detects an abnormally shaped portion formed in the band body (a corresponding one of 51 and 52) at a position on the upstream side relative to the pinch roller 16. In each of the transfer units (transfer paths) 11 and 12, the detection unit 18 detects an abnormally shaped portion formed in a band body (a corresponding one of 51 and 52) at a position on the downstream relative to the pinch roller 16. In each of the detection units 17 and 18, an abnormally shaped portion is detected using, for example, a CCD camera, a laser displacement gauge, or the like. Examples of the abnormally shaped portion formed in each of the negative electrode sheet 51 and the positive electrode sheet 52 include convex and concave portions, kinks, wrinkles, etc. Detection units 17 and 18 that perform detection in the transfer unit 11 will be referred to as detection units 17A and 18A, and detection units 17 and 18 that perform detection in the transfer unit 12 will be referred to as detection units 17B and 18B.

The winding device 1 includes a control unit (controller) 20. The control unit 20 is configured of, for example, a processing device such as a computer. The control unit 20 includes a processor or an integrated circuit (control circuit) such as a central processing unit (CPU), an application-specific integrated circuit (ASIC), a field programmable gate array (FPGA), or the like, and a storage medium such as a memory. The control unit 20 may include only a single integrated circuit, or a plurality of integrated circuits. The control unit 20 performs a process by executing a program, etc. stored in a storage medium, etc. The control unit 20 controls the operation, etc. of the constituent elements in the winding device 1. The winding device 1 may include an input unit to which an operation instruction on each of the constituent elements is input by an operator, etc., and a notification unit that gives notifications of information regarding the winding device 1, alert information, and the like. In the notification unit, notifications of information are given by, for example, sound, screen display, or the like.

Each of FIGS. 3 and 4 shows a configuration of a pinch roller 16A in a single transfer unit 11 and a neighborhood thereof. FIG. 3 shows the transfer unit (transfer path) 11 as viewed from a side on which the pinch roller 16A is positioned in the first direction, and FIG. 4 shows a state as viewed from the transfer direction in which the band body 51 is shown in a cross section that is orthogonal or substantially orthogonal to the transfer direction. In FIGS. 3 and 4, a direction along the arrows Y1 and Y2 becomes a second direction of the transfer unit 11 (width direction of the negative electrode sheet 51), and in FIG. 4, a direction along the arrows Z1 and Z2 is a first direction of the transfer unit 11 (thickness direction of the negative electrode sheet 51). A configuration of the pinch roller 16B and its neighborhood in the transfer unit 12 is similar to the configuration of the pinch roller 16A and its neighborhood in the transfer unit 11.

As shown in FIGS. 3 and 4, for example, each of the pinch rollers 16 (16A and 16B) has a central axis C, and is rotatable around the central axis C. Each of the pinch rollers 16 includes a pair of end surfaces E1 and E2, and extends from the end surface E1 to the end surface E2 along the central axis C. In each of the pinch rollers 16, the end surface E1 becomes one end in a direction along the central axis C, and the end surface E2 becomes the other end on an opposite side of the end surface E1 in the direction along the central axis. In each of the transfer units (transfer paths) 11 and 12, the pinch roller 16 is arranged in a state in which the central axis C is along the second direction, namely, the central axis C is along the width direction of a band body being transferred (a corresponding one of 51 and 52). In each of the transfer units 11 and 12, the pinch roller 16 extends from the end surface E1 to the end surface E2 along the second direction.

In each of the transfer units 11 and 12, a dimension W1 of the pinch roller 16 taken along the second direction and a dimension W2 of a band body (a corresponding one of 51 and 52) taken along the second direction are defined. In each pinch roller 16 (16A or 16B), a distance between the end surfaces E1 and E2 corresponds to the dimension W1. Also, in each of the negative electrode sheet 51 and the positive electrode sheet 52, an entire width (entire dimension) taken along the width direction corresponds to the dimension W2. The dimension W1 of each pinch roller 16 is smaller than the dimension W2 of each band body (51 or 52).

Since the dimensions W1 and W2 become the above-described magnitudes, in each of the transfer units (transfer paths) 11 and 12, the pinch roller 16 presses only a partial range of the band body (a corresponding one of 51 and 52) according to the second direction, and the remaining range of the band body (a corresponding one of 51 and 52) in the second direction is not pressed by the pinch roller 16. That is, in each of the transfer units 11 and 12, the pinch roller 16 does not abut the band body (a corresponding one of 51 and 52) over its entire width, nor does the pinch roller 16 press the band body (a corresponding one of 51 and 52) over its entire width. In each of the transfer units 11 and 12, the band body (a corresponding one of 51 and 52) is pressed from the pinch roller 16 over only the range between the end surfaces E1 and E2 of the pinch roller 16 in the second direction. In each of the transfer units 11 and 12, a band body (a corresponding one of 51 and 52) is not pressed from the pinch roller 16 in a range deviated from the pinch roller 16 in the second direction. That is, in each of the negative electrode sheet 51 and the positive electrode sheet 52, a part deviated from the pinch roller 16 in the width direction (second direction) is excluded from the range over which the pinch roller 16 presses.

In each of the transfer units (transfer paths) 11 and 12, a driving unit (driver) 21 is provided, and in each of the transfer units 11 and 12, the pinch roller 16 is mechanically coupled to the driving unit 21. The driving unit 21 is formed of, for example, a motor such as a stepping motor. In each of the transfer units 11 and 12, when the driving unit 21 is driven, a driving force is transmitted to the pinch roller 16, and the pinch roller 16 moves along the second direction. That is, in each of the transfer units (transfer paths) 11 and 12, the pinch roller 16 moves along the width direction of the band body being transferred (a corresponding one of 51 and 52) in accordance with the driving of the driving unit 21. Accordingly, in the transfer units 11 and 12, the driving unit 21 becomes a driving source for moving the pinch roller 16 along the second direction. In each of the transfer units 11 and 12, since the pinch roller 16 moves as described above, the range over which the pinch roller 16 presses in the band body (a corresponding one of 51 and 52) changes. In the examples of FIGS. 3 and 4, for example, a driving force is transmitted from the driving unit 21 to the pinch roller 16 by a linear actuator 22 that includes a motor, etc. as the driving unit 21 in each of the transfer units 11 and 12, and the pinch roller 16 moves along the second direction.

The control unit 20 acquires a result of detection at the detection units 17A and 18A, namely, a result of detection regarding an abnormally shaped portion in the negative electrode sheet 51. Based on the result of detection at the detection units 17A and 18A, the control unit 20 controls (a driving of) the driving unit 21, which is a driving source of the pinch roller 16A, and adjusts a position of the pinch roller 16A in the second direction of the transfer unit (transfer path) 11. Also, the control unit 20 acquires a result of detection at the detection units 17B and 18B, namely, a result of detection regarding an abnormally shaped portion in the positive electrode sheet 52. Based on the result of detection at the detection units 17B and 18B, the control unit 20 controls the driving unit 21, which is a driving source of the pinch roller 16B, and adjusts a position of the pinch roller 16B in the second direction of the transfer unit (transfer path) 12.

Figure 5:
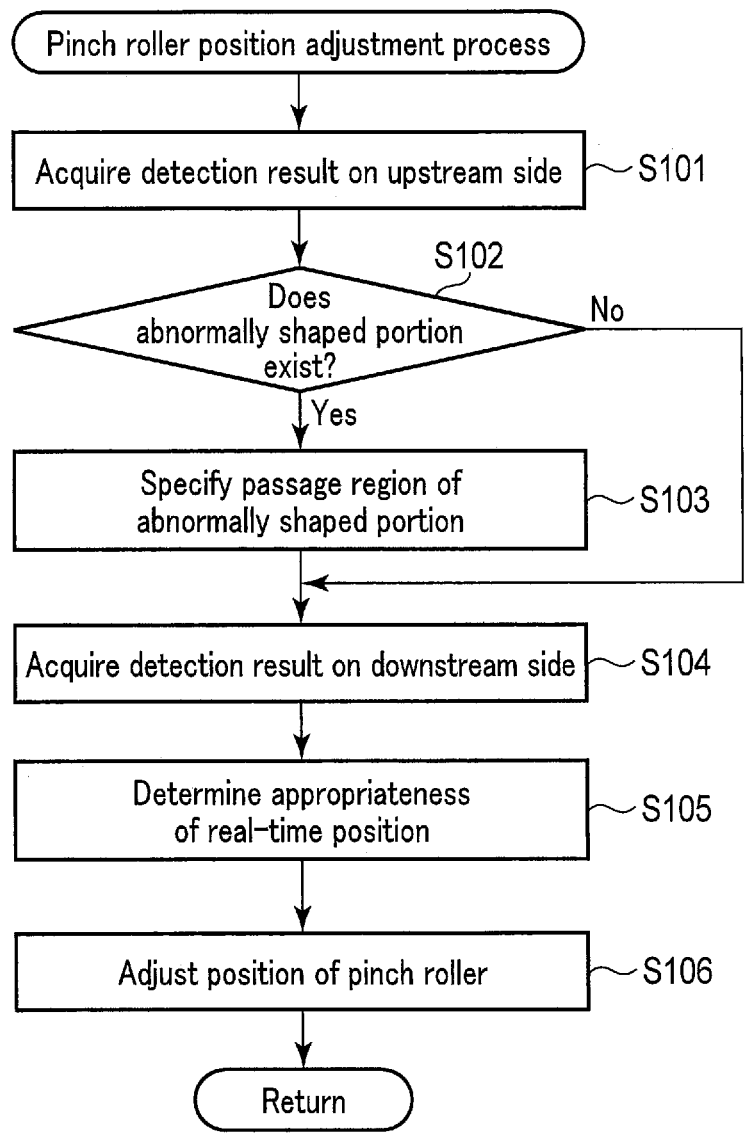
FIG. 5 is a flowchart showing an example of a process of adjusting a position of a pinch roller in a single transfer unit performed by a control unit of the winding device according to the embodiment.

FIG. 5 is a flowchart showing an example of a process of adjusting a position of the pinch roller 16A in a single transfer unit (transfer path) 11 performed by the control unit 20. The process shown in FIG. 5 is repeatedly performed while the transfer unit 11 transfers the negative electrode sheet 51 to the core 3. A process of adjusting a position of the pinch roller 16B in a transfer unit 12 is also performed by the control unit 20, similarly to the process of adjusting the position of the pinch roller 16A. That is, the process of adjusting the position of the pinch roller 16B is performed by repeatedly performing the process shown in FIG. 5 while the transfer unit 12 transfers the positive electrode sheet 52 to the core 3. Therefore, the adjustment of the position of the pinch roller in each of the transfer units 11 and 12 is performed by repeating the process shown in FIG. 5.

When the position adjustment of the pinch roller 16 is performed in each of the transfer units 11 and 12, as shown in FIG. 5, etc., the control unit 20 acquires a result of detection on an upstream side relative to the pinch roller 16, namely, a result of detection at the detection unit (first detection unit) 17 regarding an abnormally shaped portion of a band body (a corresponding one of 51 and 52) (S101). The control unit 20 determines, based on a result of detection at the detection unit 17, whether or not an abnormally shaped portion exists in a band body (a corresponding one of 51 and 52) in a region on the upstream side relative to the pinch roller 16 (S102). If it is determined that the abnormally shaped portion does not exist (S102—No), the processing advances to S104. On the other hand, when it is determined that an abnormally shaped portion exists (S102—Yes), the control unit 20 specifies a position of the detected abnormally shaped portion in the second direction, and specifies a passage region of the abnormally shaped portion during a passage time when it passes through the pinch roller 16 (S103). Thereby, it is possible to specify which of the regions in the second direction the abnormally shaped portion detected on the upstream side passes through during the passage time when it passes through the pinch roller 16. Thereafter, the processing advances to S104.

The control unit 20 acquires a result of detection on a downstream side relative to the pinch roller 16, namely, a result of detection at the detection unit (second detection unit) 18 regarding an abnormally shaped portion of a band body (a corresponding one of 51 and 52) (S104). The control unit 20 determines, based on the result of detection at the detection unit 18, an appropriateness of a real-time position of the pinch roller 16 according to the second direction (S105). Based on, for example, the result of detection acquired at S101 and S104 and the result of determination at S102, S103, and S105, the control unit 20 adjusts the position of the pinch roller 16 in the second direction (S106). Thereby, the range over which the band body (a corresponding one of 51 and 52) is pressed by the pinch roller 16 in the second direction is adjusted. At this time, when the pinch roller 16 is not changed from the real-time position, the control unit 20 does not drive the driving unit 21, and maintains the pinch roller 16 at the real-time position. On the other hand, when the pinch roller 16 is changed from the real-time position, the control unit 20 drives the driving unit 21, and moves the pinch roller 16 along the second direction.

When it is determined, for example, that an abnormally shaped portion exists on the upstream side at S102, the control unit 20 adjusts the position of the pinch roller 16 in the second direction based on the region specified as the passage region of the abnormally shaped portion at S103. At this time, the control unit 20 adjusts the position of the pinch roller 16 in the second direction so that the pinch roller 16 presses the specified passage region of the abnormally shaped portion during the passage time when it passed through the pinch roller 16. That is, the position of the pinch roller 16 according to the second direction is adjusted in such a manner that the abnormally shaped portion detected by the detection unit 17 passes through a range over which the pinch roller 16 presses. In an example, the position of the pinch roller 16 in the second direction is adjusted in such a manner that the detected abnormally shaped portion passes through a region between a pair of end surfaces E1 and E2 of the pinch roller 16 in the second direction. In this case, during the passage time when passing through the pinch roller 16, the abnormally shaped portion fits within the range over which the pinch roller 16 presses the band body (a corresponding one of 51 and 52) in the second direction.

In the determination on an appropriateness of the real-time position of the pinch roller 16 at S105, the control unit 20 determines, for example, whether or not the shape abnormality of the abnormally shaped portion detected by the detection unit 17 on the upstream side has been appropriately reduced by the passage of the pinch roller 16, based on the result of detection at the detection unit 18 on the downstream side. At S106, the control unit 20 adjusts the position of the pinch roller 16 in the second direction at a time later than the determination at S105, based on the result of determination on appropriateness at S105. When, for example, the abnormally shaped portion detected at the detection unit 17 on the upstream side is not detected by the detection unit 18 on the downstream side, the control unit 20 determines that the real-time position of the pinch roller 16 in the second direction is appropriate, and that the shape abnormality of the abnormally shaped portion has been appropriately reduced by the pinch roller 16. Accordingly, the control unit 20 maintains the pinch roller 16 at the real-time position.

On the other hand, when the abnormally shaped portion detected at the detection unit 17 on the upstream side is also detected by the detection unit 18 on the downstream side, the control unit 20 determines that the real-time position of the pinch roller 16 in the second direction is inappropriate, and that the shape abnormality of the abnormally shaped portion has not been appropriately reduced by the pinch roller 16. Accordingly, the control unit 20 moves the pinch roller 16 from the real-time position. At this time, the control unit 20 may predict the position, etc. of the abnormally shaped portion that may exist in the band body (a corresponding one of 51 and 52) on the upstream side relative to the pinch roller 16, based on the position in the second direction, shape, etc. of the abnormally shaped portion detected by the detection unit 18 on the downstream side. In this case, the control unit 20 may predict a passage region during a passage time when the abnormally shaped portion that has been predicted to exist on the side upstream relative to the pinch roller 16 passes through the pinch roller 16, and may adjust the position of the pinch roller 16 in the second direction at the position corresponding to the predicted passage region.

As described above, in the present embodiment, the control unit 20 adjusts the position of the pinch roller 16 in the second direction based on the result of detection at the detection units 17 and 18 regarding an abnormally shaped portion that may be formed in the band body (a corresponding one of 51 and 52), in the position adjustment of the pinch roller 16 in each of the transfer units (transfer paths) 11 and 12. Thereby, when, for example, an abnormally shaped portion is formed in the band body (a corresponding one of 51 and 52), the position of the pinch roller 16 in the second direction is adjusted in accordance with the position, etc. of the abnormally shaped portion. This efficiently prevents, for example, the pinch roller 16 from pressing the band body (a corresponding one of 51 and 52) at a position deviated from the abnormally shaped portion in the second direction during the passage time of the abnormally shaped portion, and efficiently prevents the shape abnormality of the abnormally shaped portion of the band body (a corresponding one of 51 and 52) from increasing as a result of the pressing by the pinch roller 16.

Therefore, in the present embodiment, in each of the transfer units (transfer paths) 11 and 12, the band body (a corresponding one of 51 and 52) is transferred to the core 3 with the shape abnormality that may be formed in the band body (a corresponding one of 51 and 52) reduced to a small level. The band bodies (51 and 52) with the shape abnormality reduced to a small level are wound around the core 3. Through the winding of the band bodies (51 and 52) around the core 3 with the shape abnormality reduced to a small level, occurrence of failures in the wound body such as the electrode group 50 can be efficiently prevented. For example, when an electrode group 50 is formed as a wound body, through winding of the negative electrode sheet 51 and the positive electrode sheet 52 around the core 3 with the shape abnormality reduced to a small level, occurrence of failures such as insulation failures and voltage failures can be efficiently prevented in the formed electrode group 50. This improves the yield in manufacturing, etc. of the electrode group 50.

In the present embodiment, in each of the transfer units 11 and 12, the pinch roller 16 presses only a partial range of the band body (a corresponding one of 51 and 52) according to the second direction, and the remaining range of the band body (a corresponding one of 51 and 52) in the second direction is not pressed by the pinch roller 16. Thus, in each of the transfer units 11 and 12, through adjustment of the position of the pinch roller 16 in the second direction based on the result of detection regarding the abnormally shaped portion as described above, the shape abnormality of the band body (a corresponding one of 51 and 52) can be reduced to a small level, compared to the configuration, for example, in which the pinch roller presses the band body over its entire width. Moreover, in the present embodiment, since the pinch roller 16 does not press the band body (a corresponding one of 51 and 52) over its entire width, it is possible to reduce abrasion, etc. of the pinch roller 16, and meandering, etc. of the band body (a corresponding one of 51 and 52) can be appropriately corrected by the pinch roller 16.

In the present embodiment, in each of the transfer units 11 and 12, a detection unit (first detection unit) 17 detects an abnormally shaped portion of a band body (a corresponding one of 50 and 51) at a position on the upstream side relative to the pinch roller 16. When the detection unit 17 has detected an abnormally shaped portion, the control unit 20 adjusts the position of the pinch roller 16 in the second direction in such a manner that the abnormally shaped portion detected by the detection unit 17 passes through a range over which the pinch roller 16 presses. Thereby, the abnormally shaped portion detected by the detection unit 17 is appropriately pressed by the pinch roller 16 during the passage time when passing through the pinch roller 16. Accordingly, the shape abnormality of the abnormally shaped portion detected by the detection unit 17 on the upstream side is appropriately reduced by the passage of the pinch roller 16.

In the present embodiment, in each of the transfer units 11 and 12, a detection unit (second detection unit) 18 detects an abnormally shaped portion of a band body (a corresponding one of 50 and 51) at a position on the downstream side relative to the pinch roller 16. The control unit 20 determines, based on the result of detection at the detection unit 18 regarding an abnormally shaped portion, an appropriateness of a real-time position of the pinch roller 16 in the second direction. Thus, determination on an appropriateness of the real-time position of the pinch roller 16 including determination as to whether or not the shape abnormality of the abnormally shaped portion has been appropriately reduced by the pinch roller 16 is appropriately performed.

In the position adjustment of the pinch roller 16 in each of the transfer units 11 and 12, the control unit 20 adjusts the position of the pinch roller 16 in the second direction at time later than the time point of determination based on a result of the above-described determination regarding an appropriateness of the real-time position of the pinch roller 16. Accordingly, when the shape abnormality of the abnormally shaped portion has not been appropriately reduced by the pinch roller 16, the control unit 20 moves the pinch roller 16 from the real-time position. Thereby, the shape abnormality of the abnormally shaped portion that may be formed in the band body is reduced further appropriately by the pinch roller 16.

In a modification, a pinch roller similar to the pinch roller 16 or a detection unit similar to the detection units 17 and 18 may be provided in one of the transfer units (transfer paths) 13 and 14. In this case, the control unit 20 may adjust the position of the pinch roller in the second direction in each of the transfer units 13 and 14, similarly to the position adjustment of the pinch roller 16 in each of the transfer units 11 and 12. In a modification, only one of the detection units 17 and 18 may be provided in each of the transfer units 11 and 12. In this case, in each of the transfer units 11 and 12, an abnormally shaped portion that is formed in a band body (a corresponding one of 51 and 52) on one of an upstream side and a downstream side relative to the pinch roller 16 is detected, and the position of the pinch roller 16 in the second direction is adjusted based on the result of detection regarding an abnormally shaped portion.

In the above-described embodiment and the like, a winding device 1 which winds, around a core 3, four band bodies (51-54) that are overlapped on one another has been described; however, the number of band bodies that form a wound body is not limited to four. In a modification, the above-described pinch roller position adjustment may be applied to a winding device which winds, around a core, two or three band bodies that are overlapped on one another, and the above-described pinch roller position adjustment may be applied to a winding device which winds, around a core, five or more band bodies that are overlapped on one another. Furthermore, the above-described pinch roller position adjustment may be applied to a case, for example, where a single band body is wound around a core. For example, when a positive electrode or a negative electrode forms a single band body integrally with a separator, two band bodies that are overlapped on one another are wound around a core, and thereby an electrode group is formed as a wound body. The above-described pinch roller position adjustment may be also applied to a winding device that forms a wound body other than an electrode group. However, in either case, a pinch roller and a detection unit that detects an abnormally shaped portion of a band body are provided in one or more transfer units (transfer paths) that transfer a band body to a core. In a transfer unit in which a pinch roller and a detection unit are arranged, the position of the pinch roller in the second direction is adjusted based on the result of detection at the detection unit regarding an abnormally shaped portion.

According to at least one of the embodiments or examples, a pinch roller presses a band body being transferred from a first direction that intersects a transfer direction, and presses a partial range of the band body in a second direction that intersects both the transfer direction and the first direction. In a transfer path, an abnormally shaped portion formed in the band body is detected, and the position of the pinch roller in the second direction is adjusted based on the result of detection regarding an abnormally shaped portion. It is thereby possible to provide a winding device and a manufacturing method of a wound body by which a band body is transferred to a core with a shape abnormality reduced to a small level.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A winding device comprising:
    a core around which a band body is wound;
    a transfer path which transfers the band body to the core;
    a pinch roller which presses the band body being transferred in the transfer path from one side of a first direction intersecting a transfer direction, and which presses a partial range of the band body in a second direction intersecting both the transfer direction and the first direction;
    a detection unit which detects an abnormally shaped portion formed in the band body in the transfer path;
    a driving unit which moves the pinch roller along the second direction; and
    a control unit which controls the driving unit based on a result of detection by the detection unit.

2. The winding device according to claim 1, wherein
    the detection unit includes a first detection unit which detects the abnormally shaped portion of the band body at a position on an upstream side relative to the pinch roller in the transfer path, and
    when the first detection unit has detected the abnormally shaped portion, the control unit adjusts a position of the pinch roller in the second direction in such a manner that the abnormally shaped portion detected by the first detection unit passes through a range over which the pinch roller presses.

3. The winding device according to claim 1, wherein
    the detection unit includes a second detection unit that detects the abnormally shaped portion of the band body at a position on a downstream side relative to the pinch roller in the transfer path, and
    the control unit determines, based on a result of detection by the second detection unit regarding the abnormally shaped portion, an appropriateness of a real-time position of the pinch roller in the second direction.

4. The winding device according to claim 3, wherein the control unit adjusts, based on a result of determination on an appropriateness of the real-time position of the pinch roller, the position of the pinch roller in the second direction at a time later than a time point of the determination.

5. The winding device according to claim 1, wherein the transfer path transfers the band body in such a manner that a thickness direction of the band body matches the first direction, and a width direction of the band body matches the second direction.

* * * * *